United States Patent
Blareau et al.

(10) Patent No.: US 11,284,627 B2
(45) Date of Patent: Mar. 29, 2022

(54) IMPROVER AND BREADMAKING METHOD FOR PRECOOKED LOAVES STORED WITHOUT FREEZING

(71) Applicant: LESAFFRE ET COMPAGNIE, Paris (FR)

(72) Inventors: François Blareau, Marcq en Baroeul (FR); Pascal Bonnardel, Marcq en Baroeul (FR); Davy De Bleser, Broevink (BE); Richard Wentworth, Linselles (FR)

(73) Assignee: LESAFFRE ET COMPAGNIE, Paris (FR)

( * ) Notice: Subject to any disclaimer, the term of this patent is extended or adjusted under 35 U.S.C. 154(b) by 27 days.

(21) Appl. No.: 15/736,794

(22) PCT Filed: Jun. 21, 2016

(86) PCT No.: PCT/FR2016/051505
§ 371 (c)(1),
(2) Date: Dec. 15, 2017

(87) PCT Pub. No.: WO2017/001744
PCT Pub. Date: Jan. 5, 2017

(65) Prior Publication Data
US 2018/0177202 A1 Jun. 28, 2018

(30) Foreign Application Priority Data
Jun. 29, 2015 (FR) ........................ 1556077

(51) Int. Cl.
| | |
|---|---|
| *A21D 8/04* | (2006.01) |
| *A21D 2/18* | (2006.01) |
| *A21D 2/22* | (2006.01) |
| *A21D 8/06* | (2006.01) |
| *A21D 2/38* | (2006.01) |
| *A21D 10/00* | (2006.01) |

(52) U.S. Cl.
CPC ............ *A21D 8/045* (2013.01); *A21D 2/181* (2013.01); *A21D 2/186* (2013.01); *A21D 2/188* (2013.01); *A21D 2/22* (2013.01); *A21D 2/38* (2013.01); *A21D 8/042* (2013.01); *A21D 8/06* (2013.01); *A21D 10/005* (2013.01)

(58) Field of Classification Search
CPC ........ A21D 8/042; A21D 8/045; A21D 2/181; A21D 2/186; A21D 2/188; A21D 2/22
See application file for complete search history.

(56) References Cited

U.S. PATENT DOCUMENTS

| | | | |
|---|---|---|---|
| 2007/0172545 A1 | 7/2007 | Dupuy et al. | |
| 2007/0202230 A1* | 8/2007 | Desbuquois | A21D 2/181 426/549 |
| 2009/0155408 A1 | 6/2009 | Dupuy-Cornuaille et al. | |
| 2013/0052698 A1 | 2/2013 | Yang et al. | |

FOREIGN PATENT DOCUMENTS

| | | |
|---|---|---|
| CN | 102 113 530 | 7/2011 |
| FR | 2 865 902 | 8/2005 |
| FR | 2 900 799 | 11/2007 |
| WO | 2006/002985 | 1/2006 |
| WO | 2011/039324 | 4/2011 |
| WO | 2013/028701 | 2/2013 |

OTHER PUBLICATIONS

International Search Report and Written Opinion of the International Searching Authority dated Aug. 25, 2016, which issued during prosecution of International Application No. PCT/FR2016/051505.
Margo-Csm, et al. "Lindenstrasse 16 CH-6340 Baar Lindenstrasse 16 CH-6340 Baar" Dec. 17, 2013, Retrieved from: http://www.margo.ch/fr/assortiment-de-boulangerie/produits/pre-melanges-pour-pains.

* cited by examiner

*Primary Examiner* — Stephanie A Cox
(74) *Attorney, Agent, or Firm* — Maier & Maier, PLLC

(57) ABSTRACT

The present invention relates to a breadmaking improver useful in a method for producing a cooked loaf by the final cooking of a precooked loaf stored without freezing. It also relates to an improved breadmaking method that implements the use of this improver. The improver of the invention enables the precooked loaf to be stored at ambient temperature or at positive low temperature for a period ranging up to one month without the freshness and taste qualities thereof being impaired. The method of the invention is useful for all types of loaves, in particular large loaves, the weight of which may reach 2 kg.

14 Claims, No Drawings

IMPROVER AND BREADMAKING METHOD FOR PRECOOKED LOAVES STORED WITHOUT FREEZING

RELATED APPLICATIONS AND INCORPORATION BY REFERENCE

The present patent application is filed pursuant to 35 U.S.C. § 371 as a U.S. National Phase Application of International Patent Application No. PCT/FR2016/051505 Filed Jun. 21, 2016, claiming the benefit of priority to French Patent Application No. 1556077 filed Jun. 29, 2015. The International Application was published as WO 2017/001744 on Jan. 5, 2017. The contents of each of the aforementioned patent applications are herein incorporated by reference in their entirety.

The present invention relates to a breadmaking improver allowing prolonged storage of precooked bread. It also relates to an improved method for preparing cooked breadmaking products starting from precooked loaves stored at room temperature or at a positive low temperature. It also relates to the baked loaves obtained.

Breadmaking relates, in the present context, to the set of steps for making a cooked bakery product, such as loaves, by oven baking after fermentation of a dough or dough ball containing by definition at least the following ingredients: cereal flour, water, salt and active baker's yeast. The term "cereal flour" refers to flour obtained from a cereal or from a combination of several cereals.

The preparation of a baking dough ready to be baked in the oven is a process comprising several steps, including at least one kneading step and at least one fermenting step.

Generally the baker works directly, i.e. in a process without delays, which may have an effect on the state of freshness of the bread. Baked in the morning, the bread remains fresh until early in the afternoon, then its quality declines with drying or softening of the crust and a loss of crispness and flavor and a loss of softness of the crumb. Today, the modern consumer expects to find fresh bread at any time of the day, including in the evening on leaving work.

So as to be able to meet consumers' demands, a baker would have to bake several times a day, at intervals, i.e. staggered working. Now, preparation of a dough ready to be cooked is long, labor-intensive work, and the dough can be stored for a limited time before being put in the oven. At room temperature the storage time is less than 2 hours. The time is less than 75 hours if stored at 4° C., i.e. at what is commonly called a positive low temperature. Anyway, storage never goes beyond 3 days.

Several methods have been developed for overcoming this problem.

1—Freezing of baked bread: For example, there have been attempts to freeze fully baked bread or similar products, and then thaw it just before sale by heating in the oven for a short time. This method has two important shortcomings: on the one hand, the crumb dries out, with appearance of white haloes or crowns and, on the other hand, the crust flakes off. This method of freezing fully baked bread therefore does not give bakery products of good quality.

2—Precooked dough stored at 4° C. or frozen: Thus, "precooked dough" technology is known. This technology is characterized by a step of precooking the fermented dough, which causes the dough in the center to stiffen, and forms a flexible film at the periphery, the precursor of the crust. A particular feature of precooked dough is the absence of browning of this flexible film: a light browning indicates the beginning of crust formation and therefore that the precooking stage is already over. This will be reflected in further shortcomings: losses of productivity and flaking of the crust after final baking. The precooking step is therefore particularly "tricky". In most cases "precooked dough" technology excludes pieces with large dimensions, because of the difficulty of stiffening the center but without causing flaking of the crust. Therefore they are mostly bread rolls, half-baguettes, or short baguettes. The precooked dough may either be stored for some hours in conditions avoiding drying-out (freshly precooked), or frozen. It is also important to limit drying of precooked doughs before, during and after freezing. During final baking, typically at the point of sale, the frozen precooked doughs go directly from the freezer to the oven. Fresh bread is therefore available at any time after 10 to 20 minutes of final baking, depending on the shape and weight of the precooked dough balls. An important shortcoming of the existing frozen precooked dough technology is shrinkage of the precooked dough during final baking, which reduces the volume by at least 10%.

Documents U.S. Pat. Nos. 4,788,067 and 4,861,601 describe methods appertaining to this precooked dough technology that require a final step of baking the precooked dough for 10 to 15 minutes.

Document WO 2006/002985 in the applicant's name proposes an improved method making it possible to supply good-quality baked products straight from the oven, throughout the day and in a short time. In this method, a ready-to-bake fermented shaped dough ball corresponding to the baked product is precooked in an oven until its crumb has set and a crust has formed and changed color. The precooked dough ball thus obtained is frozen for storage.

Thus, the precooked dough techniques and methods known from the prior art either require freezing of the precooked dough ball for storage, or require reducing the storage time to the minimum, as these methods employ precooked dough, which does not store well or for long.

To overcome the above problems, the applicant has developed a breadmaking improver that allows precooked loaves to be stored at room temperature for up to 7 days, or at a positive low temperature for a storage time of up to 1 month while preserving an excellent state of freshness. The baked loaves obtained by final baking of the precooked loaves using the improver according to the invention have good characteristics of taste and freshness.

Thus, the applicant has developed an improved method for making baked bread obtained by final baking of a precooked dough ball stored at room temperature for a period of up to 7 days or stored at a positive low temperature for several days and up to 1 month without any deterioration of the freshness of the final baked bread. This method, which will be described in detail hereunder, comprises the use of the improver according to the invention.

The improver according to the invention comprises:
an enzyme composition comprising a maltogenic exoamylase,
an oxidant such as ascorbic acid,
pregelatinized starch, or a source of pregelatinized starch such as a pregelatinized cereal flour, and
malted wheat flour.

The applicant found, after numerous tests, that the use of a maltogenic exoamylase in the improver according to the invention makes it possible to store the precooked dough ball at room temperature or at a positive low temperature for some days without any deterioration of its freshness or that of the end product.

Here, the term maltogenic exoamylase denotes the enzymes, classified under reference EC 3.2.1.1, that are able to degrade maltotriose to maltose and glucose.

The enzyme composition of the breadmaking improver of the invention may comprise, in addition to the maltogenic exoamylase, enzymes such as alpha or beta amylase, amyloglucosidase, pullulanase, endo- and exoamylases, cellulases, xylanases, proteases, lipases and phospholipases.

Preferably the enzyme composition of the breadmaking improver of the invention comprises amyloglucosidase, alpha amylase, and xylanase, in addition to the maltogenic exoamylase.

Preferably the improver according to the invention comprises:
an enzyme composition comprising maltogenic exoamylase, amyloglucosidase, alpha amylase, and xylanase, ascorbic acid,
pregelatinized wheat flour, and
malted wheat flour.

When the improver according to the invention is used in a breadmaking method such as will be described hereunder, the different constituents are used at the following contents, which are expressed in baker's percentage, i.e. relative to 100% of the flour in the kneading machine:
maltogenic exoamylase at a content between 50 and 200 ppm,
amyloglucosidase at a content between 50 and 500 ppm,
alpha amylase at a content between 1 and 20 ppm,
xylanase at a content between 10 and 80 ppm,
ascorbic acid at a content between 50 and 300 ppm,
pregelatinized wheat flour at a content between 0.1 and 4%, and
malted wheat flour at a content between 0.05 and 0.5%.

The improved method according to the invention is a method for making baked bread by final oven baking of a precooked dough ball or loaf stored at room temperature or at a positive low temperature, the dough ball being prepared with ingredients comprising a breadmaking improver according to the present invention, in addition to yeast, salt, flour and water.

This method gives precooked dough balls that can be stored at room temperature for up to 7 days and at a positive low temperature for a period of up to one month while remaining in a state of optimal freshness.

In the context of the present invention, the term "oven" refers to ovens where heating of the dough is effected with heat. This term "oven" therefore does not cover microwave ovens. The oven is preferably a bakery oven, notably of the rotary type, or with a fixed hearth, or else in the form of a tunnel, but may also be any domestic oven allowing the indicated temperatures to be reached inside the oven. Bakery ovens allow breadmaking items to be baked at temperatures between 150° C. and 280° C., optionally with steam injection in the oven.

The term "baked product" refers to a fully cooked product, ready to be consumed. In the case of the traditional method of frozen precooked dough and in the case of the invention, a baked product is therefore the product after final baking and consequently is different from the precooked dough ball, which has only undergone precooking.

According to the method of the invention, a fermented, formed dough ball, ready for baking and corresponding to the baked final product, is precooked in an oven until its crumb has set and a crust has formed and changed color. The precooked dough ball thus obtained is cooled for storage. The fully cooked product is obtained by final baking of the precooked dough ball in the oven for a time less than or equal to 10 minutes, and preferably for a time between 3 and minutes, at an oven temperature between 200° C. and 260° C. Advantageously, final baking is effected at a temperature from 200° C. to 220° C.

Furthermore, final baking does not require steam injection.

According to one embodiment, precooking is effected in an oven preheated to a temperature between 220° C. and 280° C. and preferably between 210° C. and 250° C. Preferably, the internal temperature at the end of precooking is greater than or equal to 95° C.

In general, bread freshness means bread that is not spoiled, wrinkled or stale. In other words, bread that still has its freshly-baked taste, with crumb that is still soft, still in its raised state and still has its elasticity for good chewing and a good mouth feel.

In the present context, the terms "colored" and "coloration" refer to browning of the crust during baking in the oven, this browning notably distinguishing the crust from the crumb.

Usefully, cooling of the precooked dough ball is effected so as to quickly reach an internal temperature less than or equal to 30° C. or else 40° C. if the precooked dough ball is subsequently stored at room temperature.

The precooked dough ball may thus be stored at 4° C. for several days or even for a month without any deterioration of its appearance or freshness.

The dough ball is by definition prepared with at least cereal flour, water (optionally added in the form of milk or some other product containing water), salt and active baker's yeast.

According to the method of the invention, the dough ball is prepared from a composition comprising flour, water, salt, baker's yeast and the breadmaking improver of the invention.

Other ingredients may also be included in the composition of the dough ball.

The following may be mentioned as a guide:
at least one sugar that takes part in the Maillard reaction in an amount exceeding that which is fermented by the yeast before precooking and is sufficient to give color to the crust during precooking and/or an enzyme composition that is able to supply at least one sugar that takes part in the Maillard reaction in an amount exceeding that which is fermented by the yeast before precooking and is sufficient to give color to the crust during precooking, and/or at least one protein that is involved in the mechanism of the Maillard reaction, and
at least one food-grade stabilizing agent.

The reactions of the Maillard type are all the reactions in which, under the action of heat, sugars having a reducing function will give colored compounds with the nitrogen-containing compounds. The sugars that are the most reactive are sugars with 5 or 6 carbon atoms, but sugars with 12 carbon atoms, such as sucrose, lactose and maltose, also take part in these reactions.

Thus, the ingredients of the dough ball may usefully comprise at least one ingredient containing a sugar or a protein that takes part in reactions of the Maillard type, said ingredient being selected from the group of whey, lactose, glucose (=dextrose), galactose, sucrose and fructose.

The sugar in excess that takes part in reactions of the Maillard type, such as glucose or xylose, is supplied at least partially, or even completely, during fermentation of the dough ball by at least one enzyme preparation, and in particular an enzyme preparation containing at least one amyloglucosidase.

Other ingredients performing a role of improver may also be added during preparation of the dough ball.

Thus, the ingredients of the dough ball may comprise one or more food-grade stabilizing agents, preferably selected from the food-grade stabilizing agents corresponding to cellulose derivatives, chemically or physically modified starches, gums and pregelatinized flours, and in particular one or more food-grade stabilizing agents selected from carboxymethylcellulose, xanthan gum, guar, and carob.

The dough ball may be prepared with ingredients comprising simultaneously:
the improver according to the invention,
a food-grade stabilizing agent; and
an ingredient containing a sugar or proteins that take part in reactions of the Maillard type, preferably whey and/or glucose.

Advantageously, the dough ball is prepared with ingredients comprising simultaneously:
the improver according to the invention,
a food-grade stabilizing agent,
a source of enzymes which, during fermentation of the dough, supply sugars that take part in reactions of the Maillard type, and
an emulsifier.

The preferred emulsifiers are the emulsifiers E472e and E472f (diacetyl tartrate esters of mono- and diglycerides of fatty acids).

The terms malted cereal flours or cereal malt, or enzymatic malt extract, are regarded as equivalents, covered by the term "malted cereals". This rule also applies when the cereal is specified by name (wheat, barley).

The invention also relates to the baked products obtained by the methods according to the invention.

The present invention is particularly useful for baked products selected from all types of bread, including special bread, including Vienna bread, milkbread, and brioches. The weight of the baked product may notably be from 30 g to 2 kg. The invention is particularly interesting for dough balls from 200 g to 2 kg; it does not relate to pizza dough or croissants.

Thanks to the present invention, a high-quality fresh baked product can now be supplied in 5 minutes or less. This is particularly interesting for sales in hotspots, but the invention also allows the baker to help out customers who have an urgent need for a fresh breadmaking product after exhaustion of the baker's usual output for the day. Finally, the invention is also of interest for consumers who want to obtain high-quality baked products by carrying out the final baking themselves.

The present invention also allows slicing of the bread in a shorter time after final baking. For example, for an 850 g baked loaf, slicing is possible after 30 min of cooling (sweating) instead of 60 min.

The advantages of the present invention are illustrated more clearly in the examples given below.

EXAMPLES

Example of Baked Bread According to the Invention (Test 4) and Comparative Examples (1, 2 and 3)

The procedure for preparing the ready-to-bake dough used for the 4 examples given below is as follows:
Basic Composition of the Dough:
Flour 100%, water 57%, pressed yeast 1.9%, salt 1.65%. Any other recipe may also work (wholemeal bread, multicereal bread, sourdough bread, etc.).

The formulas of the doughs according to the invention and according to the comparative examples are expressed, as usual in this technical field, as baker's percentage, i.e. in parts by weight of the ingredient per 100 parts by weight of cereal flour used. They are given in Table 1 below.

The fresh baker's yeast or pressed baker's yeast is a yeast with about 30% of dry matter, sold under the name blue "HIRONDELLE"® by GIE LESAFFRE at 94701 Maisons Alfort, France.

Method:

Kneading: 3 minutes at 1st speed in a spiral kneading machine, and 8 minutes at 2nd speed. Note that any type of kneading machine is suitable.

Temperature of the dough: 26° C.

Dividing: in pieces of 950 g, rounding, followed by 20 min rest at room temperature, shaping, placing in open mold, fermentation for 80 min at 30° C. and at 80% relative humidity (RH).

Precooking: for 30 min in an oven initially heated to 250° C. and then at 210° C. with steam injection. The internal temperature is between 95° C. and 97° C.

Cooling for 1-1.5 h at room temperature until an internal temperature of 30° C. is reached.

Packaging each loaf under air in waterproof packaging.

Storage at 4° C. for 7 days.

Final baking without steam for 5 min at 210° C. (any type of oven), internal temperature 10° C.

Cooling at room temperature for 20 min until the internal temperature reaches 30° C.

Machine slicing and packaging under air. Storage at room temperature for 7 days and measurement of the freshness of the crumb during said storage.

Results/Observations:

The baked loaves were assessed by a panel of experts. The results and observations recorded are as follows:

the crust is of good color and does not have flakes, whether after precooking or after final baking. The final products according to the invention are slightly more colored than those of the comparative examples.

the shrinkage of the dough ball during final baking is less than 5% based on the volume of the baked product. No notable difference between the products according to the invention and those of the comparative examples.

The crumb of the baked products does not have white halos or crowns as in the case of a fully baked product that has been frozen and then thawed.

The loaf baked by the method of the invention retains its freshness even after 7 days of storage at room temperature: score 5/10 compared to 2 and 3 for tests 1, 2 and 3.

The combination of ingredients of test 2 and 3 shows at 4 a greater synergistic effect in terms of bread freshness.

As illustrated in the examples, the present invention makes it possible, at any time of day and in just a few minutes of final baking, to supply the consumer with a product of oven-fresh quality, which remains fresh for several days of storage.

The following table (Table 1) presents the composition as well as the freshness score established for each of the tests undertaken:

TABLE 1

| labeling | Test 1 | Test 2 | Test 3 | Test 4 |
|---|---|---|---|---|
| | \multicolumn{4}{c}{g/100 kg flour} | | | |
| Pregelatinized wheat flour | | 2612.610 | | 2612.610 |
| Wheat flour | 4986.560 | 2003.000 | 4979.06 | 1995.500 |
| Malted wheat flour | | 360.000 | | 360.000 |
| Amyloglucosidase | | 10.950 | | 10.950 |
| Ascorbic acid | 10.800 | 10.800 | 10.800 | 10.800 |
| Antistaling maltogenic exoamylase | | | 7.500 | 7.500 |
| Alpha amylase | 1.440 | 1.440 | 1.440 | 1.440 |
| Xylanase | 1.200 | 1.200 | 1.200 | 1.200 |
| | 5000.000 | 5000.000 | 5000.000 | 5000.000 |
| Result for crumb freshness (crumb texture scored by a panel of experts in sensory analysis, mean value from 1 to 10, 10 being the best score) at 7 days at room temperature | 2 | 2 | 3 | 5 |

The invention claimed is:

1. A breadmaking improver comprising:
 a. an enzyme composition consisting of:
  between 50 and 200 ppm of antistaling maltogenic exoamylase,
  between 50 and 500 ppm of amyloglucosidase,
  between 1 and 20 ppm of alpha amylase, and
  between 10 and 80 ppm of xylanase,
 b. between 50 and 300 ppm of ascorbic acid,
 c. between 0.1 and 4% of pregelatinized wheat flour, and
 d. between 0.05 and 0.5% of malted wheat flour,
 wherein enzymes in the breadmaking improver consist of said enzyme composition, and
 wherein concentrations of said contents are expressed in baker's percentages,
 said breadmaking improver allowing storage of precooked bread dough without freezing at room temperature for up to 7 days or at 4° C. for up to 1 month.

2. A method for making baked bread comprising the steps of:
 preparing precooked bread dough with ingredients comprising flour, salt, baker's yeast, water and a breadmaking improver, said breadmaking improver comprising:
 a. an enzyme composition consisting of:
  between 50 and 200 ppm of antistaling maltogenic exoamylase,
  between 50 and 500 ppm of amyloglucosidase,
  between 1 and 20 ppm of alpha amylase, and
  between 10 and 80 ppm of xylanase,
 b. between 50 and 300 ppm of ascorbic acid,
 c. between 0.1 and 4% of pregelatinized wheat flour, and
 d. between 0.05 and 0.5% of malted wheat flour,
 wherein enzymes of the ingredients with which the precooked bread dough is prepared consist of said enzyme composition,
 wherein concentrations of said contents are expressed in baker's percentages, and
 baking the precooked bread dough to form a baked bread;
 wherein the precooked bread dough is stored without freezing at room temperature for up to 7 days or at 4° C. for up to 1 month.

3. The method of claim 2, wherein said ingredients further comprise:
 at least one ingredient containing at least one sugar and/or at least one protein taking part in the Maillard reaction selected from the group of whey, lactose, glucose, galactose, sucrose, fructose,
 at least one food-grade stabilizing agent selected from the group consisting of cellulose derivatives, gums and pregelatinized flours, wherein the gums are selected from the group consisting of xanthan, guar, and carob; and
 at least one emulsifier.

4. The method of claim 2, wherein:
 the step of preparing precooked bread dough with ingredients comprising flour, salt, baker's yeast, water and a breadmaking improver comprises the steps of:
  making a formed, fermented dough ball from said ingredients that is ready to be cooked,
  precooking the formed, fermented dough ball in an oven until an internal temperature of greater than or equal to 95° C. is reached to form precooked bread dough with a set crumb, a formed crust, and a changed color compared to the formed, fermented dough ball, and
  cooling and storing the precooked bread dough; and
 the step of baking the precooked bread dough to form the baked bread comprises a final baking step in an oven at a temperature between 200 and 260° C. for less than 10 minutes.

5. The method of claim 4, wherein the final baking step is carried out at a temperature between 200 and 220° C.

6. The method of claim 4, wherein the final baking step is carried out without steam injection.

7. The method of claim 4, wherein the precooking step is carried out at a temperature between 220 and 280° C.

8. The method of claim 4, wherein in the cooling and storing step, the precooked bread dough is cooled for storage until its internal temperature is less than or equal to 30° C. for subsequent storage at 4° C.

9. The method of claim 8, wherein the storage is carried out at 4° C. for a period of up to one month.

10. The method of claim 4, wherein in the cooling and storing step, the precooked bread dough is cooled for storage until its internal temperature is less than or equal to 40° C. for subsequent storage at room temperature.

11. The method of claim 10, wherein said storage is carried out at room temperature for a period of up to 7 days.

12. The method of claim 4, wherein the final baking step is carried out for 3 to 7 minutes.

13. The method of claim 4, wherein the precooking step is carried out at a temperature between 210 and 250° C.

14. The method of claim 2, wherein the baked bread is selected from the group consisting of crust loaves, Vienna bread, and milkbread, wherein the baked bread having has a weight ranging from 30 g to 2 kg.

* * * * *